Jan. 31, 1939.  O. KUHNAST  2,145,626

TWO-STROKE INTERNAL COMBUSTION ENGINE

Filed Sept. 12, 1936   2 Sheets-Sheet 1

Patented Jan. 31, 1939

2,145,626

UNITED STATES PATENT OFFICE 2,145,626

TWO-STROKE INTERNAL COMBUSTION ENGINE

Oswald Kuhnast, Horn, near Roermond, Netherlands

Application September 12, 1936, Serial No. 100,566
In the Netherlands October 29, 1935

1 Claim. (Cl. 123—65)

The invention relates to a two stroke internal combustion engine in which the space below the piston which is shut off from the crank case serves as a pumping space for the scavenging and combustion air, if desired for the fuel-air mixture, and the inlet and the outlet of the working cylinder and the pump are controlled by ports in the cylinder wall which are opened and closed by the piston.

In engines of this construction the scavenging and the charging are very defective, since the pumping space below the piston is far smaller than the space above the piston, which is particularly bad for engines that draw in air only, whereas the fuel is injected, as is the case with crude oil (semi-Diesel) engines, since these engines are in need of a great deal of air for scavenging and charging purposes.

According to the invention this drawback is obviated by the fact that the suction channel of the pump ends in ejector-shaped mouthpieces arranged along the cylinder wall and opening in the direction of the scavenging air or the scavenging gas air mixture of the combined suction and pressure channel of the pump. In this manner a perfect charging of the cylinder is assured.

With the aid of a fan located in the flywheel casing and attached to the flywheel the supply of air or air-fuel mixture to the pump may be considerably increased.

It is evident that although mention is made above of a channel and of ports, one may also use a plurality of channels and a single port.

The invention is further explained with the aid of the drawings, in which

Fig. 1 is a vertical section of an engine according to the invention, whereas

Figure 1:
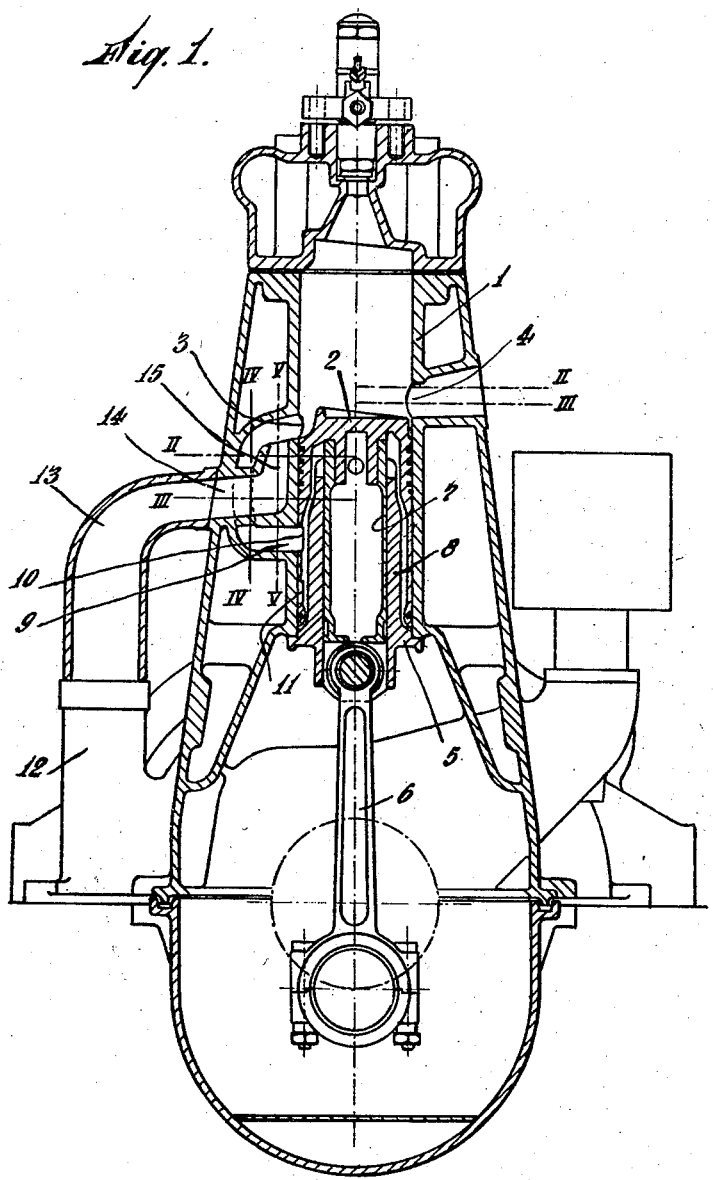
Figure 2:
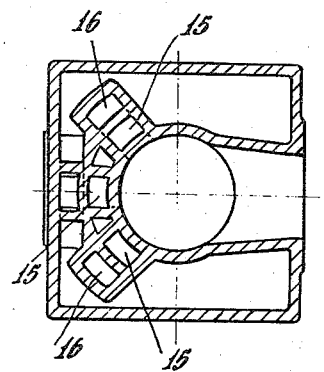
Fig. 2 is a horizontal section in the broken plane II—II of Fig. 1.
Figure 3:
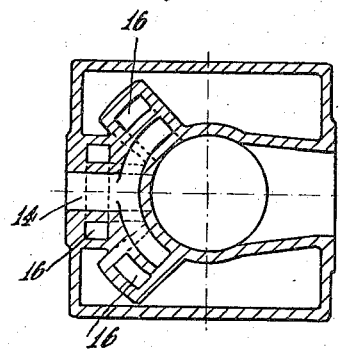
Fig. 3 is a horizontal section in the broken surface III—III of Fig. 1.

The engine cylinder 1 in which a piston 2 is adapted to reciprocate, is provided with inlet ports 3 and outlet ports 4 located opposite to the same. The portion of the cylinder located below the piston is separated from the crank shaft space by a cover or partition 5. The piston 2 is provided with a cylindrical portion 7 to which the connecting rod 6 is connected and which fits into a central cylindrical portion 8 of the cover 5. The wall of the space below the piston which is shut off by the cover 5 is provided with ports 9 which in the lowest position of the piston will correspond to apertures 10 provided in the piston wall.

Figure 5:
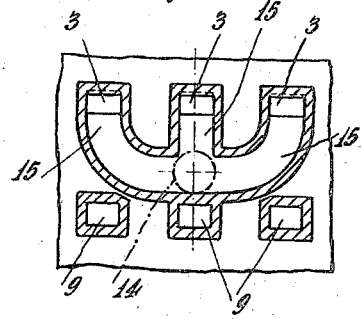

On the flywheel casing is mounted a fan casing, the outlet opening of which is indicated by 12 (Fig. 1). To this outlet is connected a tube 13 which in its turn is connected to the inlet opening 14 of the cylinder 1, while three branches 15 are leading to the three inlet ports 3. The location of the said channels is shown in Fig. 5. The ends of the branches located near the inlet ports 3 are directed vertically upwardly and are of ejector shape.

Figure 4:
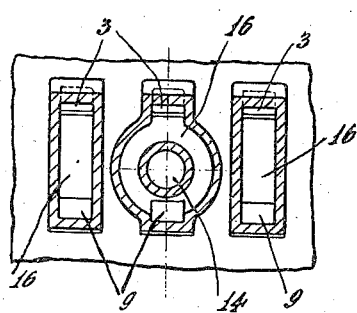
Fig. 4 is a vertical section in a cylindrical plane indicated by IV—IV in Fig. 1 and laid out in a level plane and Fig. 5 is a similar section in the cylindrical plane indicated by V—V in Fig. 1.

There are also three ports 9 each connected with one of the inlet ports 3 by means of channel 16 as shown in Fig. 4. The central channel which cannot run straight upwards on account of the inlet opening 14, is divided into two channels located on either side of the said opening 14, as plainly shown in Fig. 4.

The engine operates as follows:

When the piston 2 is raised, the apertures 10, and in the highest position the lower apertures 11 of the piston, will communicate with the ports 3 provided in the cylinder wall, while the air or the fuel-air mixture is drawn into the pumping space below the piston. The air is then supplied by the fan via the conduit 12, 13, the inlet opening 14 and the channels 15. When the piston has reached its highest position and the ignition has occurred and the expansion stroke has been accomplished, the highest apertures 10 in the piston are in line with the ports 9, and the air or the fuel-air mixture compressed in the pumping space will flow into the cylinder with great velocity over and past the mouths of the inlet channels 15 via the inlet ports 3.

In the channels 15a suction will be created by the air flowing over the same, whereby the quantity of air or mixture supplied by the pump, will be increased with the quantity of air drawn from the channel 15, thus perfecting the scavenging and the charging.

I claim:

In a two stroke internal combustion engine, a cylinder having inlet and outlet ports, a cover over the end of the cylinder opposite the combustion chamber, a piston in said cylinder controlling said inlet and outlet ports, the space between the piston and the cover serving as a pump chamber for the preliminary compression of air, a connecting passage between the pump chamber and the inlet port, a blower, and a passage connected with the blower and terminating within the connecting passage, the air flowing along said connecting passage during the operation of the engine passing over the terminal of the passage externally of the cylinder and producing an ejector-like effect to draw air into the cylinder through said passage.

OSWALD KUHNAST.

CERTIFICATE OF CORRECTION.

Patent No. 2,145,626. January 31, 1939.

OSWALD KUHNAST.

It is hereby certified that error appears in the above numbered patent requiring correction as follows: In the heading to the printed specification, line 7 thereof, for the foreign filing date "October 29, 1935" read October 19, 1935, as shown by the records of this office; and that the said Letters Patent should be read with this correction therein that the same may conform to the record of the case in the Patent Office.

Signed and sealed this 18th day of April, A. D. 1939.

Henry Van Arsdale (Seal) Acting Commissioner of Patents.